United States Patent [19]

Amen et al.

[11] Patent Number: 5,123,756
[45] Date of Patent: Jun. 23, 1992

[54] ROLLER BEARING AND SEGMENTED ROLLER RETAINER THEREFOR

[75] Inventors: Rafael Amen; Bo Goransson, both of Gothenburg; Rolf Gustafsson, Hindås; Nils Nyman, Gothenburg, all of Sweden

[73] Assignee: AB SKF, Gothenburg, Sweden

[21] Appl. No.: 622,423

[22] Filed: Dec. 4, 1990

[30] Foreign Application Priority Data

Dec. 4, 1989 [SE] Sweden .................... 8904083

[51] Int. Cl.$^5$ ......................................... F16C 33/372
[52] U.S. Cl. .................................. 384/551; 384/569; 384/604
[58] Field of Search ............... 384/551, 571, 604, 623, 384/621, 569

[56] References Cited

U.S. PATENT DOCUMENTS

| | | | |
|---|---|---|---|
| 1,226,685 | 5/1917 | Modler | 384/551 |
| 2,431,810 | 12/1947 | Knaak | 384/551 |
| 3,606,504 | 9/1971 | Wojciechowski | 384/551 |
| 3,966,284 | 6/1976 | Martin . | |
| 4,056,293 | 11/1977 | Lobeck et al. . | |
| 4,235,487 | 11/1980 | Schard . | |
| 4,239,304 | 12/1980 | Wakunami . | |

*Primary Examiner*—Lenard A. Footland
*Attorney, Agent, or Firm*—Burns, Doane, Swecker & Mathis

[57] ABSTRACT

A spherical roller thrust bearing comprises two bearing rings rotatably guided by spherical roller elements for rotation about an axis. The roller elements are spaced circumferentially apart by a segmented retainer comprising separate retainer segments spaced apart in the circumferential direction. Each retainer segment includes opposite circumferentially facing surfaces engaging adjacent roller elements. Each surface includes at least one projection making point contact with a peripheral surface of a roller at a location whereby the force transmitted between the roller elements by the segments excludes a radially inward force component. The projections are located relative to the roller elements such that the segments tend to hang upon the roller elements.

18 Claims, 2 Drawing Sheets

ROLLER BEARING AND SEGMENTED ROLLER RETAINER THEREFOR

BACKGROUND OF THE INVENTION

The present invention refers to a roller bearing comprising two bearing rings, a number of roller elements provided between the bearing rings, and a cage or retainer for the roller elements whereby the retainer comprises a number of segments.

Roller retainers of this basic type are described in U.S. Pat. Nos. 3,966,284, 4,056,293, 4,235,487 and 4,239,304. In these previously known designs the segments are mutually connected.

The present invention is applicable to roller bearings in general, but is mainly intended for use with spherical roller thrust bearings. Normally, spherical roller thrust bearings are manufactured with two different retainer designs, either with a retainer of pressed sheet-metal, or with a solid retainer which is guided by a sleeve mounted in the hole of the outer ring or shaft washer.

The present invention intends, when applied to spherical roller thrust bearings, to offer an alternative to the last-mentioned conventional retainer design. In that conventional design, pockets are bored in a solid retainer ring, which puts great demands on the machine equipment from operational and capacity aspects.

An object of the present invention is to provide a segmented retainer arrangement for large bearings which is relatively simple and inexpensive to produce.

Another object of the invention is to provide a segmented retainer arrangement, which can be given close tolerances at the contact points with the roller elements.

A further object of the invention is to provide a segmented retainer arrangement, in which a favorable force cooperation between the retainer and roller elements is obtained.

Another object of the invention is to provide a segmented retainer arrangement, in which contact between adjacent segments is avoided.

Still another object of the invention is to provide a segmented retainer arrangement, where the retainer construction holds together the set of rollers and the inner ring when the bearing is handled.

SUMMARY OF THE INVENTION

These objects are achieved by the present invention which involves a roller bearing, preferably a spherical thrust roller bearing, which comprises two bearing rings, and a plurality of roller elements arranged between the bearing rings for permitting relative rotation between the bearing rings about an axis. A segmented retainer arrangement circumferentially spaces apart the roller elements. The retainer arrangement comprises a plurality of retainer segments. Each roller element is positioned between- circumferentially adjacent ones of the retainer segments. The adjacent retainer segments are non-interconnected and are spaced circumferentially apart to define circumferential play therebetween which permits the adjacent retainer segments to move circumferentially relative to one another. The retainer segments and roller elements are so configured that the force transmitted between circumferentially adjacent roller elements by the retainer segments excludes a radially inward force component.

Preferably, the force is tangentially oriented. The direction of the force is achieved by a configuration of the surfaces of the retainer segments to make point contact with the curved outer periphery of a respective roller element.

Preferably, the point contact is created by outward projections on the surfaces of the segments.

It is preferable that each retainer segment also includes a pair of radially facing surfaces each of which includes a projection arranged to make point contact with an end surface of a roller element.

THE DRAWINGS

The objects and advantages of the invention will become apparent from the following detailed description of a preferred embodiment thereof in connection with the accompanying drawings, in which like numerals designate like elements, and in which.

DETAILED DESCRIPTION OF A PREFERRED EMBODIMENT OF THE INVENTION

Figure 1:
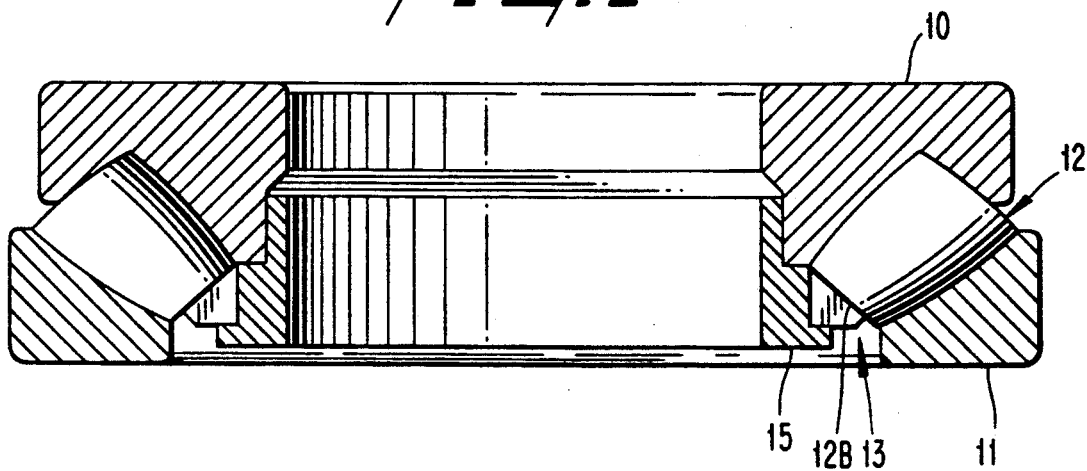
FIG. 1 is a longitudinal sectional view through a spherical roller thrust bearing according to the invention.

A spherical roller thrust bearing according to the invention comprises an outer ring or shaft washer 10, an inner ring or casing washer 11, and a number of rollers 12 arranged between the rings. A sleeve 15 includes a cylindrical portion 15B mounted in a cylindrical portion 10A of the ring 10 and is arranged to guide a segmented retainer 13 for the rollers 12. Each roller 12 includes a peripheral surface 12A defining a roller axis 12D, and radially inner and outer end surfaces 12B, 12C.

The retainer 13 comprises a number of retainer segments 14, each segment comprising a base portion or shoe 24 and a bar 25 projecting therefrom. Lateral surfaces 16, 17 of the bar 25, which face in opposite circumferential directions, are intended to fit against respective ones of two adjacent rollers 12.

The shoe 24 includes ears 24A which project laterally relative to the surfaces 16, 17 of the bar 25. Each ear 24A includes a generally radially facing surface 23 which extends laterally beyond a respective surface 16 or 17 of the bar 25.

According to one aspect of the invention, the rollers 12 are in the form of spherical roller type thrust bearings. That means that the peripheral surface 12A of the roller comprises a segment of a circle when the roller is viewed in axial cross-section (i.e., axially with reference to the roller axis 12D).

Each roller 12 is arranged to be guided between the opposed surfaces 16, 17 of two circumferentially adjacent segments 14. The adjacent segments are non-interconnected and provided with a mutual play 18 in the circumferential direction of the bearing. Thus, while the segments 14 are indeed guided by the sleeve 15, they are movable with respect to each other in the circumferential direction of the bearing. In accordance with the present invention, the segments transmit rolling forces from a roller 12 to an adjacent roller 12 without appreciably loading the segments 14 with radial inward force components that must be absorbed by the relatively weak sleeve 15. This is achieved in that the surfaces 16, 17 are configured to make point contact with the rollers 12 at a location on the curved outer periphery thereof wherein a force transmitted from a segment 14 to an adjacent roller 12 excludes a radially inward force component which would load the sleeve 15. The creation of such point contact between the segment surfaces 16, 17 and the roller peripheries is preferably achieved by shaping the contact regions 19 as outward projections of the surfaces 16, 17.

Figure 4:
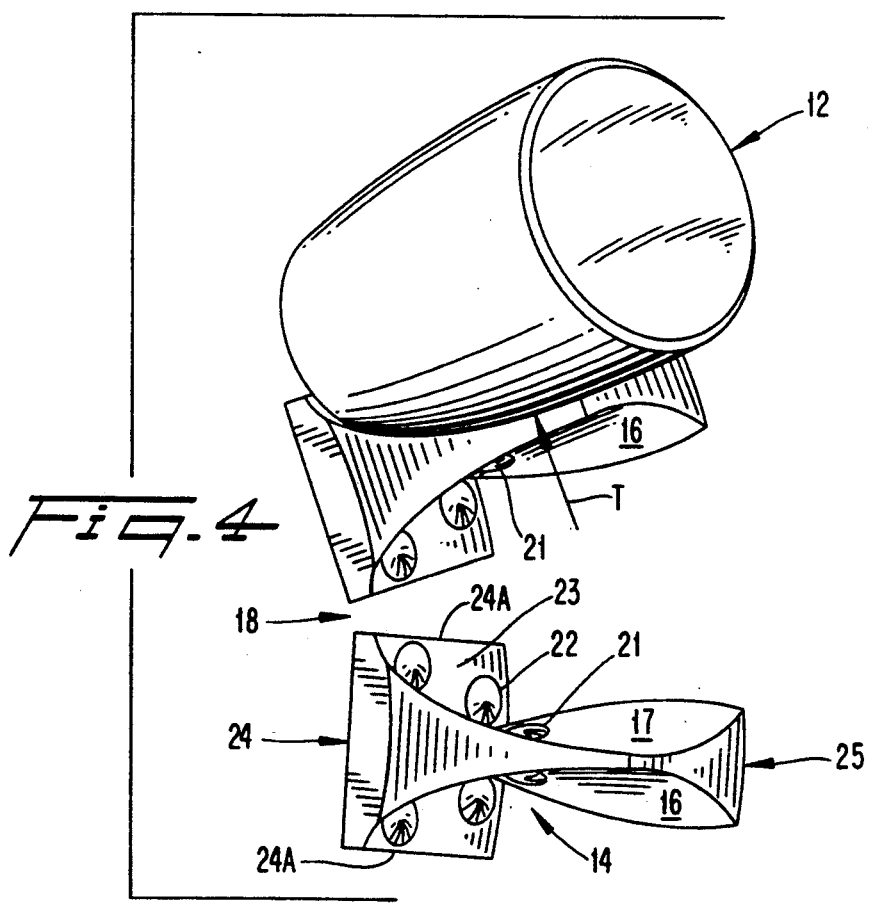
FIG. 4 is a top view of the segments and the roller of FIG. 3.

It would be desirable that the force be transmitted precisely in a tangential direction T (with reference to the axis of rotation A). That tangential force shown in FIG. 4 is achieved by creating the point contact at an optimum location 19' shown in FIG. 2. However, it is preferable to ensure that no radial inward force component will result from slight manufacturing inaccuracies, by instead situating the point contact location 19 slightly outwardly (with reference to the axis 12D of the roller) of the optimum point 19' (see FIG. 2). That may result in the transmission of an outward force F (FIG. 2), but ensures that the relatively weak sleeve 15 will not be radially loaded.

Figure 2:
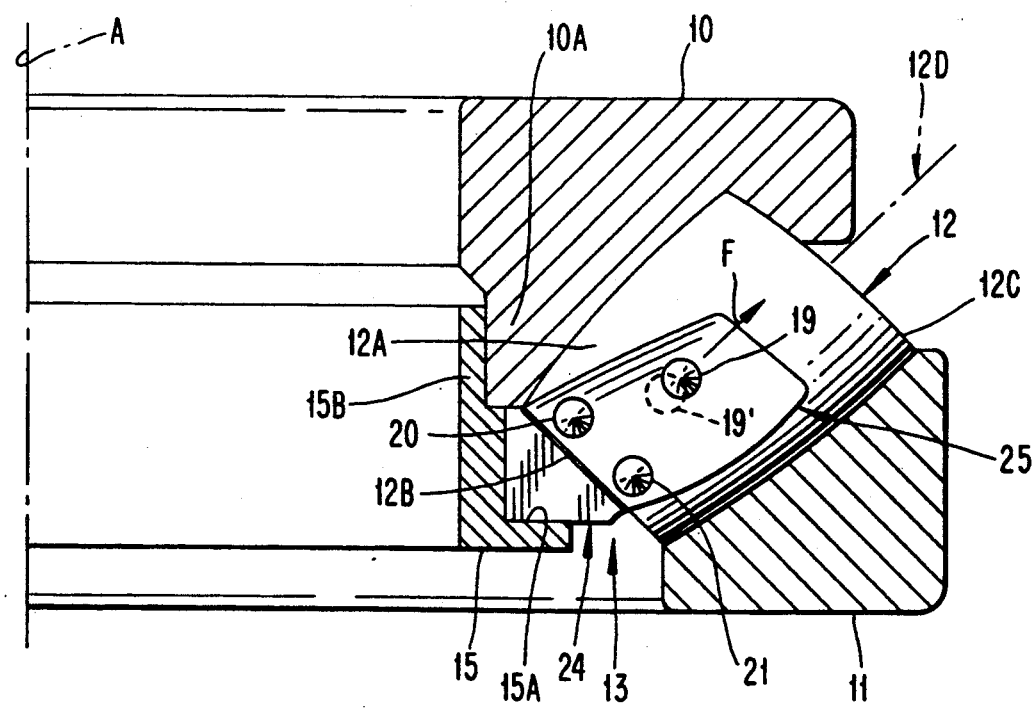
FIG. 2 is an enlarged view of a portion of FIG. 1.
Figure 3:
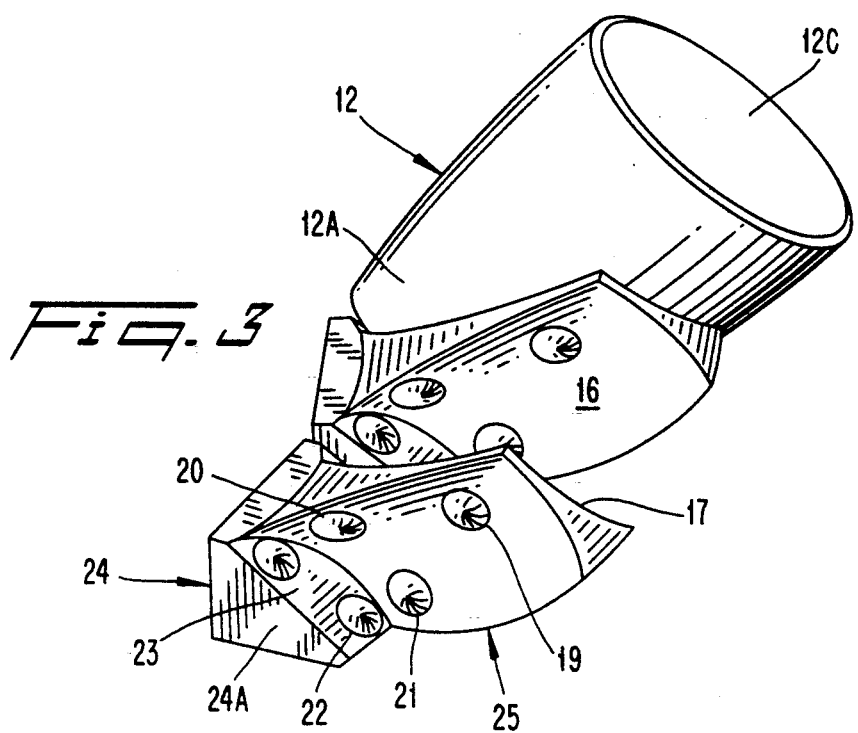
FIG. 3 is a perspective view of two adjacent retainer segments and a spherical roller.

The optimum point 19' is normally situated at a position corresponding to the shortest spacing between the adjacent rollers. By displacing the contact point slightly outwardly thereof to point 19 (as depicted in FIG. 2), there is achieved not only the above-discussed assurance against radial inward loading of the sleeve 15, but also a relationship wherein the contact points will cause the rollers to hang upon the segments during operation of the roller bearing as well as when the ring 10 has been removed (thereby facilitating the handling of the bearing).

Thus, according to another aspect of the invention, likewise applied to spherical roller thrust bearings, a segmented retainer ring is provided of such design that the roller set and the inner ring are held together as a unit when the outer ring is dismounted. This is achieved by arranging the segments 14 such that the shoes 24 bear against a radial support surface 15A on the sleeve 15 and by making the lateral surfaces 16, 17 of the bar 25 curved generally in accordance with the curvature of the roller periphery 12A, so that the surfaces 16, 17 on two adjacent bars 25 together form a seat in which a roller 12 is nested. Furthermore, on each of the lateral surfaces 16, 17 the projection 19 is arranged slightly outwardly of the closest points separating two adjacent rollers 12. As noted earlier, radial and axial forces acting on the sleeve are thus minimized.

Satisfactory guiding of the roller 12 is obtained with only one projection on the lateral surfaces 16, 17. In the embodiment shown, however, radially inside the projection 19, two additional projections 20, 21 are arranged on each of the lateral surfaces to make point contact with the peripheral surface 12A of a roller 12. In the illustrated embodiment, moreover, two additional projections 22 are arranged on each of the lateral surfaces 23 for making point contact with the radically inner end surface 12B of a roller 12.

In the illustrated embodiment, the segments 14 are formed in such a way that the bars 25 extend generally radially outwardly from the shoe 24. It is, however, possible to alternatively arrange a sleeve or other suitable support means at the radially outer side of the inner ring 10, whereby the bars on the segments would extend generally radially inwardly from the shoe of such segments. The contact points between a roller and both segments straddling same would, for the above-discussed reasons, be arranged essentially at the closest points of two adjacent rollers.

Above the invention has been described in connection with spherical roller thrust bearings. Obviously, the invention can be applied on other types of thrust bearings and should also be generally applicable on rolling bearings.

Although the present invention has been described in connection with a preferred embodiment thereof, it will be appreciated by those skilled in the art that additions, modifications, substitutions, and deletions not specifically described may be made without departing from the spirit and scope of the invention as defined in the appended claims.

What is claimed is:

1. A roller bearing comprising two bearing rings defining a common longitudinal axis, a plurality of roller elements arranged between said bearing rings permitting relative rotation between said bearing rings about said axis, and retaining means for circumferentially spacing apart said roller elements, said retaining means comprising a plurality of retainer segments, each roller element positioned between circumferentially adjacent ones of said retainer segments, said adjacent retainer segments being on-interconnected and spaced circumferentially apart to define circumferential play therebetween permitting said adjacent retainer segments to move circumferentially relative to one another, each of said retainer segments including circumferentially facing surfaces engaging respective roller elements, each of said surfaces including means making point contact with a respective roller element for transmitting a force from one of said roller elements to a circumferentially adjacent roller element in a direction which excludes a radially inward force component with respect to said axis.

2. A roller bearing according to claim 1, wherein said means making point contact with a respective roller element transmits said force from one roller element to a circumferentially adjacent roller element in said direction which is substantially tangentially oriented with reference to said axis.

3. A roller bearing according to claim 1, wherein said roller bearing constitutes a thrust bearing and said roller elements comprise spherical rollers.

4. A roller bearing according to claim 1, wherein said means making point contact comprises an outward projection on each of said surfaces.

5. A roller bearing according to claim 4, wherein each of said surfaces includes second and third projections spaced radially inwardly from said first projection and each making point contact with a roller element.

6. A roller bearing according to claim 5, wherein each of said retainer segments includes a pair of radially facing surfaces, each of said radially facing surfaces including a fourth projection arranged to make point contact with an end surface of a roller element.

7. A roller bearing according to claim 6, wherein said radially facing surfaces face radially outwardly, said fourth projections engaging radially inner end surfaces of said roller elements.

8. A roller bearing according to claim 1, wherein said circumferentially facing surfaces of said segments are curved in complementary fashion relative to said peripheral surfaces of said roller elements.

9. Spherical roller thrust bearing comprising two bearing rings, a plurality of spherical roller elements arranged between said bearing rings for permitting relative rotation between said bearing rings about an axis, and retaining means for circumferentially spacing apart said roller elements, said retaining means comprising a plurality of retainer segments, each roller element positioned between circumferentially adjacent ones of said retainer segments, each of said retainer segments including circumferentially facing surfaces engaging respective roller elements, said surfaces including means making point contact with said roller elements such that the force transmitted between circumferentially adjacent roller elements by said retainer segments excludes a radially inward force component.

10. A spherical roller thrust bearing according to claim 9, wherein said means defining point contact comprises at least one projection on each of said circumferentially facing surfaces.

11. A spherical roller thrust bearing according to claim 10, wherein said point contact is arranged such that said force is substantially tangentially oriented with reference to said axis.

12. A spherical roller thrust bearing according to claim 9, wherein said means defining point contact between said circumferentially facing surfaces and said roller elements are situated substantially at a location where the circumferential spacing between adjacent roller elements is minimum.

13. A spherical roller thrust bearing according to claim 9, wherein said means defining point contact between said circumferentially facing surfaces and said roller elements are spaced slightly outwardly from a location where the circumferential spacing between adjacent roller elements is minimum, whereby said segments hang upon said roller elements.

14. A spherical thrust bearing comprising two bearing rings, a plurality of spherical roller elements arranged between said bearing rings permitting relative rotation between said bearing rings about an axis, and retaining means for circumferentially spacing apart said roller elements, said retaining means comprising a plurality of retainer segments each configured to engage two of said roller elements, comprising first and second parts attached together to secure said retainer segments and said roller elements against dislodgement from one bearing ring so as to hold said roller elements, said retainer segments, and said one bearing ring together when the other bearing ring is removed from said bearing ring.

15. A spherical thrust bearing according to claim 14, wherein said second part comprises a sleeve having a cylindrical portion received within a cylindrical portion of said first part, said first and second parts including generally radially extending portions between which said retainer segments and roller elements are secured.

16. A retainer segment adapted for use in a segmented retainer of a spherical roller thrust bearing comprised of a pair of bearing rings, and spherical roller elements disposed between said bearing rings, said retainer segment comprising a base and a bar projecting laterally therefrom, said bar including two oppositely facing surfaces for supporting adjacent ones of the roller elements, each of said surfaces of said bar including projections for contacting a roller element by means of point contact.

17. A retainer segment according to claim 16, wherein said surfaces are curved in a manner generally corresponding to a curved outer periphery of a spherical roller, said base portion including lateral surfaces extending laterally relative to said oppositely facing surfaces of said bar.

18. A retainer segment according to claim 16, wherein said projections constitute first projections on said oppositely facing surfaces situated at a location corresponding to a minimum spacing between adjacent roller elements, each of said oppositely facing surfaces further including second and third projections situated closer to said base portion than said first projection, said base portion including two lateral surfaces extending laterally of said oppositely facing surfaces, each of said lateral surfaces including a fourth projection adapted to engage an end surface of a roller element.

* * * * *